United States Patent
Sheem et al.

(10) Patent No.: US 6,395,427 B1
(45) Date of Patent: May 28, 2002

(54) NEGATIVE ACTIVE MATERIAL FOR RECHARGEABLE LITHIUM BATTERY AND METHOD OF PREPARING SAME

(75) Inventors: Kyou-Yoon Sheem; Sang-Young Yoon; Wan-Uk Choi; Jae-Yul Ryu; Sang-Jin Kim, all of Chungcheongnam (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/651,178

(22) Filed: Aug. 29, 2000

(30) Foreign Application Priority Data

Nov. 4, 1999 (KR) ........................... 99-0048647

(51) Int. Cl.⁷ ............................................. H01M 10/24
(52) U.S. Cl. ................................ 429/231.8; 429/231.95
(58) Field of Search ........................ 252/502; 423/414; 429/218.1, 231.95, 231.8, 231.4, 231.1

(56) References Cited

U.S. PATENT DOCUMENTS

| | | | |
|---|---|---|---|
| 4,770,825 A | * 9/1988 | Sara | 264/29 |
| 5,932,373 A | * 8/1999 | Nagamine et al. | 429/218.1 |
| 6,030,726 A | * 2/2000 | Takeuchi et al. | 429/231.8 |
| 6,040,092 A | * 3/2000 | Yamada et al. | 429/331 |
| 6,103,423 A | * 8/2000 | Itoh et al. | 429/231.8 |
| 6,156,432 A | * 12/2000 | Mabuchi et al. | 428/408 |
| 6,156,457 A | * 12/2000 | Takami et al. | 429/231.4 |

FOREIGN PATENT DOCUMENTS

| | | | |
|---|---|---|---|
| JP | 1-303727 | 11/1989 | |
| JP | 2-38343 | 2/1990 | |
| JP | 04061666 | 3/1992 | ............ H01M/4/02 |
| JP | 07009921 | * 1/1995 | |
| JP | 07232071 | 8/1995 | ............ H01M/4/58 |
| JP | 07232072 | 8/1995 | ............ H01M/4/58 |
| JP | 408138744 A | * 5/1996 | |
| JP | 408298121 A | * 11/1996 | |
| JP | 409007592 A | * 1/1997 | |
| JP | 411339798 A | * 12/1999 | |

* cited by examiner

Primary Examiner—Gabrielle Brouillette
Assistant Examiner—M. Wills
(74) Attorney, Agent, or Firm—Blakely Sokoloff Taylor & Zafman (57) ABSTRACT

A negative active material for a rechargeable lithium battery which exhibits good discharge capacity and charge and discharge efficiency, and enables the use of all types of electrolytes. The active material includes a crystalline carbon core and a semi-crystalline carbon shell. The semi-crystalline carbon shell includes at least one element or a compound of at least two different types of elements, and has a turbostratic or half onion-sheath. The compound includes only element. The element serves graphitization catalyst and causes a change in a structure of surrounding carbon. In particular, the negative active material includes metal boride.

12 Claims, 2 Drawing Sheets

NEGATIVE ACTIVE MATERIAL FOR RECHARGEABLE LITHIUM BATTERY AND METHOD OF PREPARING SAME

CROSS REFERENCE TO RELATED APPLICATION

This application is based on application Nos. 1999-36935, 1999-48647, and 2000-635 filed in the Korean Industrial Property Office on Sep. 1, 1999, Nov. 4, 1999, and Jan. 7, 2000, respectively, the content of which is incorporated hereinto by reference.

BACKGROUND OF THE INVENTION (a) Field of the Invention

The present invention relates to a negative active material for a rechargeable lithium battery and a method of preparing the same and, more particularly, to a negative active material which exhibits high capacity and good charge and discharge efficiency.

(b) Description of the Related Art

Metallic lithium was initially used as the negative active material in rechargeable lithium batteries. However, metallic lithium causes an abrupt capacity loss and deposits to form a dendric layer which induces short circuit between the negative and positive active material and a reduction in the cycle life of the battery.

The problem of lithium reactivity toward the electrolyte has been addressed by replacing metallic lithium with carbon-based materials. With the use of carbon-based active materials, the potential safety problem present in metallic lithium-based batteries can be prevented while achieving a relatively higher energy density as well as a reasonable shelf life.

There are two main types of carbon-based materials used crystalline graphite and amorphous carbon. Crystalline graphite includes artificial graphite and natural graphite. Typical examples of artificial graphite may include mesocarbon fiber (MCF) and mesocarbonmicro beads (MCMB). There has been introduced somewhat recently artificial graphite, which is doped with a different element from carbon to produce an inexpensive negative active material exhibiting good electrochemical performance.

Mesophasecarbon microbeads and mesophase fiber are easily produced, but are expensive. Also, because of a stabilizing step that must be performed, mesophasecarbon microbeads and mesophase fiber have substantially lower discharge capacities than natural graphite. Natural graphite on the other hand has a high discharge capacity, but a higher irreversible capacity than mesophasecarbon microbeads or mesophase fiber. Also, because natural graphite is plate shaped, discharge properties are extremely deteriorated.

To overcome such problems, various studies has been conducted on shapeless and low coke-based artificial graphite in which elements such as boron are used as a doping material to enhance the overall performance of the battery.

Japanese Patent Laid-open No. Hei 3-165453 (Central Devices Co.) discloses a method in which a BCN(H) type negative active material is produced using a CVD (Chemical Vapor Deposition) procedure.

Japanese Patent Laid-open No. Hei 3-245458 (Sony) discloses a method in which organic materials are carbonized by adding 0.15 to 2.5 wt % of B compounds using an autoclave procedure to prepare a negative active material.

Japanese Patent Laid-open No. Hei 5-266880 (Matsushita) discloses a in which B, $B_2O_3$ or $H_3BO_3$ is added to petroleum pitch and the mixture is heat-treated at 2000° C. for 20 hours to prepare a negative active material.

Japanese Patent Laid-open No. Hei 9-63584 (Petoca) and Hei 9-63585 (Petoca) disclose methods in which after pulverizing mesophase fiber, B compounds are added to the fiber and the mixture is heat-treated.

However, in all of the above methods, a negative active materials results that is deficient in at least one important aspect including capacity, charge and discharge efficiency, current density, and cycle life.

SUMMARY OF THE INVENTION

It is an object of the present invention to provide a negative active material for a rechargeable lithium battery which exhibits high capacity and good charge and discharge efficiency.

It is another object to provide the negative active material for a rechargeable lithium battery which exhibits high current density and good cycle life.

It is another object to provide a method of preparing the negative active material for a rechargeable lithium battery.

These and other objects may be achieved by a negative active material for a rechargeable lithium battery including a crystalline carbon core and a semi-crystalline carbon shell formed on the core. The semi-crystalline carbon shell includes at least one element or a compound of at least two different types of elements, and has a turbostratic or half onion-sheath. The compound includes only element. The element serves graphitization catalyst and causes a change in a structure of surrounding carbon.

The negative active material includes 0.01 to 20 wt % of metal boride.

In order to achieve these objects and others, the present invention provides a method of preparing a negative active material for a rechargeable lithium battery. In this method, amorphous carbon or crystalline carbon is mixed with at least one element, or compound thereof. The compound of the element includes an A-B compound and an A-C compound. A and B are respectively at least one element and C is not an element. Thus, the A-B compound refers to a compound including only the element and the A-C compound refers to a compound including another component in addition to the element. The element serves graphitization catalyst and causes a change in a structure of surrounding carbon. Following the mixing step, the mixture is graphitized at 2000 to 3200° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

A negative active material for a rechargeable lithium battery of the present invention includes a crystalline carbon core and a semi-crystalline carbon shell formed on the core.

The semi-crystalline carbon shell includes at least one element (hereinafter referred to a catalyst element) or a compound of at least two different elements (hereinafter referred to catalyst element $M_1M_2M_3 \ldots M_n$ compound, where n is an integer). The compound consists of only at least one element.

The catalyst element includes one or more of a transition metal, an alkali metal, an alkali earth metal, a semi-metal of Group 3A of the Periodic table, a semi-metal of Group 3B, a semi-metal of Group 4A, an element of Group 5A, an element of Group 5B, a lanthanide or an actinium. Preferably, the transition metal is selected from Mn, Ni, Fe, Cr, Co, Cu, Mo, W, Te, Re, Ru, Os, Rh, Ir, Pd or Pt; the alkali metal is selected from Li, Na or K; the alkali earth metal is selected from Be, Sr, Ba, Ca or Mg; the semi-metal of Group 3A is selected from Sc, Y, La or Ac; the semi-metal of Group 3B is selected from B, Al, or Ga; the semi-metal of Group 4A is selected from Ti, Zr or Hf, the semi-metal of Group 4B is selected from Si, Ge, or Sn; the element of Group 5A is selected from V, Nb, or Ta; the element of Group 5B is selected from P, Sb or Bi; the lanthanide is selected from Ce, Pr, Nd, Pm, Sm, Eu, Gd, Tb, Dy, Ho, Er, Tm, Yb or Lu; and the actinium is selected from Th, U, Nb or Pu. An example of the catalyst element $M_1M_2M_3 \ldots M_n$ compound is $M_1M_2M_3\ldots B$ compound, that is metal boride. The exemplary thereof includes $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride, and cobalt boride.

The catalyst element and the catalyst element $M_1M_2M_3 \ldots M_n$ compound serve a graphitization catalyst and causes the conversion of surrounding carbon structure. Accordingly, the catalyst element and the catalyst element $M_1M_2M_3 \ldots M_n$ compound causes the conversion of an amorphous carbon precursor on a surface of the active material to a semi-crystalline carbon structure as well as the conversion of an amorphous carbon core to a crystalline structure. The semi-crystalline carbon structure is a skeletal, turbostratic, or half onion-sheath.

The negative active material includes 0.01 to 20 wt % of the catalyst element. If the amount of the catalyst element is less than 0.01 wt %, the effect of increasing the graphitization degree of the active material is not induced. Whereas, if the amount of the catalyst element is more than 20 wt %, the excess catalyst element may be impurity and the movement of lithium ions may be prohibited. In the case where the negative active material utilizes the catalyst element $M_1M_2M_3 \ldots B$ compound, metal boride, it is clear that 0.01 to 20 wt % of the metal boride presents in the negative active material, because the metal boride consists of only the catalyst elements.

More preferably, the negative active material includes 0.005 to 10 wt % of B and 0.005 to 10 wt % of another element excluding B. The another element include transition metal, alkali metal, alkali earth metal, semi-metal selected from Group 3A, 3B, 4A, and 4B, element of 5A, and 5B, lanthanide, or actinium. The transition metal is selected from Mn, Ni, Fe, Cr, Co, Cu, Mo, W, Te, Re, Ru, Os, Rh, Ir, Pd or Pt. The alkali metal is selected from Li, Na, or K. The alkali earth metal is selected from Be, Sr, Ba, Ca or Mg. The semi-metal of Group 3A is selected from Sc, Y, La or Ac. The semi-metal of Group 3B is Al or Ga. The semi-metal of Group 4A is selected from Ti, Zr or Hf. The semi-metal of Group 4B is selected from Si, Ge, or Sn. The element of Group 5A is selected from V, Nb, or Ta. The element of Group 5B is selected from P, Sb, or Bi. The lanthanide is selected from Ce, Pr, Nd, Pm, Sm, Eu, Gd, Tb, Dy, Ho, Er, Tm, Yb, or Lu. The actinium is selected from Th, U, Nb, or Pu. Boron acts as an acceptor in the graphitization process such that electron transfer during initial lithium intercalation is accelerated. Furthermore, by including boron, the edge of the artificial graphite active material takes on a half onion-sheath structure, which able to use propylene carbonate electrolyte and to reduce irreversible capacity.

By the catalyst element or the catalyst element $M_1M_2M_3 \ldots M_n$ compound, the carbon shell of the negative active material is a semi-cryst alline and has a skeleton structure, turbostratic structure or half onion-sheath structure. In the semi-crystalline carbon shell, the catalyst element or the catalyst element $M_1M_2M_3 \ldots M_n$ compound, particularly metal boride nano particles, is uniformly distributed.

Figure 1A:
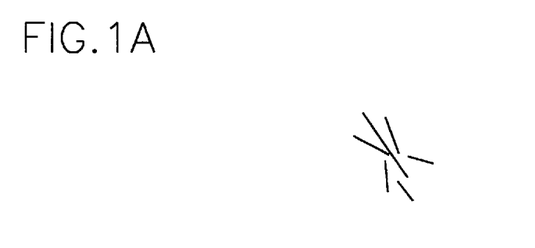
FIGS. 1a and 1b are schematic views showing surface structures of a negative active material of the present invention.
Figure 1B:
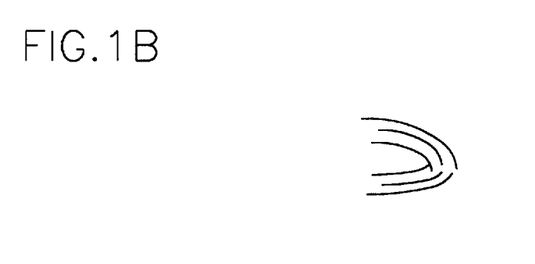
Figure 1C:
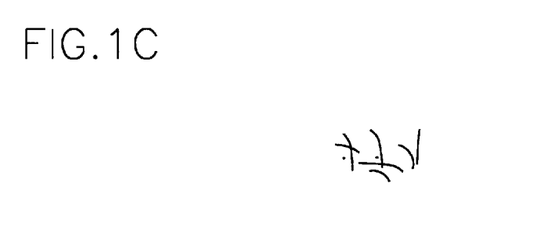
FIG. 1c is a schematic view showing a surface structure of amorphous carbon.

FIGS. 1a, 1b and 1c show a turbostratic structure, half onion-sheath structure, and an amorphous carbon structure, respectively. As shown in FIGS. 1a, 1b and 1c, turbostratic and half onion-sheath structures are distinguished from the amorphous structure.

The negative active material preparation will be illustrated in more detail. The two cases in which an amorphous carbon precursor is and is not used are described.

1) Without the use of amorphous carbon precursor Amorphous carbon or crystalline carbon is mixed with catalyst elements or compounds thereof. The compounds are classified into an A-B compound and an A-C compound. A and B are each at least one element and C is not an element. Hereinafter, the catalyst elements and the compounds refer to as addition materials.

The mixing step may be performed by adding a solid type or a liquid type addition material to amorphous carbon or crystalline carbon. In the case of the liquid type addition material, a solvent used may be water, an organic solvent or a mixture thereof. The organic solvent may be ethanol, isopropyl alcohol, toluene, benzene, hexane or tetrahydrofuran. The liquid type addition material preferably has a sufficient concentration to enable uniform mixing. If the concentration is excessively low, it is difficult to dry the solvent and to uniform mix. On the other hand, if the concentration is too high, the compounds such as the catalyst element are agglomerated which is unable to react with carbon.

The mixing step by using the liquid type addition material may be performed by using mechanical apparatus to mix the addition material solution with amorphous carbon or crystalline carbon, or by spray-drying, spray-pyrolyzing, or freeze-drying the solution to the carbon. Examples of the mechanical apparatus include a kneading procedure with carbon and the addition material solution, a procedure in which a mixer having wings with a structure to apply a shear stress is used, and a mechanochemical procedure where shear stress is applied to particles to melt of a surface of the particles.

If miniscule particles are used for the carbon core, a coating step is performed together with an agglomeration step. When the coating step and the agglomeration step are performed at the same time, a plurality of primary particles is agglomerated to form a mass. Hereinafter, the minuscule particles are referred to as "primary particles" and the agglomerated masses are referred to as "secondary particle". In the coating and agglomerating step, the amorphous carbon acts as a binder to induce the agglomeration of the primary particles. If spray-drying is performed, globular secondary particles may be produced. If the other coating methods are used, shapeless secondary particles may be produced.

In the mixing step, the weight ratio of amorphous carbon or crystalline carbon to the catalyst element is preferably 99.99 to 80: 0.01 to 20. If the catalyst element compounds or compounds including at least two elements is used, the weight ratio of amorphous carbon or crystalline carbon to the catalyst element in the compound is the same.

The catalyst element may be one or more of a transition metal, an alkali metal, an alkali earth metal, a semi-metal of Group 3A, Group 3B, Group 4A, and Group 4B, an element of Group 5A and 5B, a lanthanide, an actinium or a mixture thereof. Preferred are transition metals such as Mn, Ni, Fe, Cr, Co, Cu, Mo, W, Te, Re, Ru, Os, Rh, Ir, Pd or Pt; alkali metals such as Li, Na or K; alkali earth metals such as Be, Sr, Ba, Ca or Mg; semi-metals of Group 3A such as Sc, Y, La or Ac; semi-metals of Group 3B such as B, Al or Ga; semi-metals of Group 4A such as Ti, Zr or Hf; semi-metals of Group 4B such as Si, Ge or Sn; elements of Group 5A such as V, Nb or Ta; elements of Group 5B such as P, Sb, or Bi; lanthanide series such as Ce, Pr, Nd, Pm, Sm, Eu, Gd, Tb, Dy, Ho, Er, Tm, Yb or Lu; or actinium series such as Th, U, Nb or Pu. Examples of the compound include oxides, nitrides, carbides, sulfides, hydroxides or hydrides of the element and the exemplary are titanium-t-isopropoxide, nickel nitrate or $B_2O_3$. Also, examples of the compound having at least two elements include oxides, nitrides, carbides, sulfides, sulfides, hydroxides, or hydrides of at least two element-included compound and the exemplary are $Ca(BH_4)$, $LiBH_4$, $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride or cobalt boride.

The carbon core may be a large single particles with a diameter of 1 to 75 μm or minuscule particles, that is primary particles with a diameter of 0.1 to 30 μm.

The amorphous carbon may be soft carbon or hard carbon. The soft carbon is produced by heat-treating coal tar pitch, petroleum pitch, tar, or heavy oil with low molecular weight at about 1000° C. The hard carbon is produced by heat-treating phenol resin, naphthalene resin, polyvinylalcohol resin, urethane resin, polyimide resin, furan resin, cellulose resin, epoxy resin or polystyrene resin at about 1000° C. Furthermore, during the heat-treating step, a polymerization catalyst such as $Br_2$, $Cl_2$ or $I_2$ may be used. Alternatively, carbon raw material which is heat-treated at 350 to 400° C. to increase a softening point and yield, is heat-treated at about 1000° C. to obtain soft carbon or hard carbon. Alternatively, mesophase pitch prepared by heat-treating petroleum type carbon raw material, coal type carbon raw material or resin type raw material at 300 to 600° C., mesophase pitch carbide prepared by heat-treating raw cokes and carbon raw material with or without performing an oxide stabilization process on the carbon raw material at 600 to 1500° C., or fired cokes may be used.

The crystalline carbon may be shapeless, disk-shaped, flake, globular or fibrous natural graphite, artificial graphite or a mixture thereof.

Thereafter, the carbon core coated with the addition material is heat-treated at 2000 to 3200° C. under inert atmosphere or an air sealing atmosphere. As a result of heat-treating, only the catalyst elements remain. Accordingly, the crystalline carbon shell being the surface of the active material includes only the catalyst elements. In addition, if two or more catalyst elements are used, the catalyst elements are bonded to generate catalyst element $M_1M_2M_3 \ldots M_n$ compounds on a surface of the crystalline carbon or amorphous carbon. The exemplary of generated catalyst element $M_1M_2M_3 \ldots M_n$ compounds are $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride or cobalt boride.

Alternatively, if compounds including at least two catalyst elements are used, only the catalyst element $M_1M_2M_3 \ldots M_n$ compounds remain on the surface of the crystalline carbon or amorphous carbon. Furthermore, as described above, in the present invention, the catalyst element $M_1M_2M_3 \ldots M_n$ compounds, for example, $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride or cobalt boride, are directly mixed with the crystalline carbon or the amorphous carbon.

Furthermore, the catalyst element or the catalyst element $M_1M_2M_3 \ldots M_n$ compound causes a skeletal structure on the surface of the crystalline carbon or the amorphous carbon and causes the conversion of the crystalline carbon or the amorphous carbon into a turbostratic structure or a half onion-sheath structure.

If the amorphous carbon is used for the core, the amorphous carbon is converted into crystalline carbon, if the crystalline carbon is used for the core, the crystallinity of the core is increased. The turbostratic structure is characterized by a quasi-amorphous state and a more or less disordered orientation due to a radically low crystallization degree and a minimal crystalline size. The catalyst element can cause the conversion of the amorphous carbon precursor on the surface of the active material to a semi-crystalline carbon structure and the amorphous carbon core to a crystalline structure.

Furthermore, since the addition materials may partly evaporate during the heat-treating step, the amount of the catalyst element on the surface of the active material may be reduced to less than an amount initially added.

2) With the use of amorphous carbon precursor

The preparation of the negative active material with the use of an amorphous carbon precursor will now be described. Areas where the method of preparation is identical to that where no precursor is used will be omitted.

Amorphous carbon or crystalline carbon is mixed with an addition material and an amorphous carbon precursor.

The mixing step may be performed by adding a solid type or a liquid type addition material to amorphous carbon or crystalline carbon. In the case of the liquid type addition material, a solvent used may be water, an organic solvent or a mixture thereof. The organic solvents may be ethanol, isopropyl alcohol, toluene, benzene, hexane or tetrahydrofuran.

In the mixing step, the weight ratio of the mixed weight of amorphous carbon or crystalline with the amorphous carbon precursor to the catalyst element is preferably 99.99 to 80: 0.01 to 20. If the catalyst element compounds or compounds including at least two elements is used, the weight ratio of amorphous carbon or crystalline carbon to the catalyst element in the compound is the same. The weight ratio may be varied according to the properties of the desired resulting material.

The amorphous carbon precursor may be resins such as phenol resin, naphthalene resin, polyvinylalcohol resin, urethane resin, polyimide resin, furan resin, cellulose resin, epoxy resin, polystyrene resin, coal tar pitch, petroleum pitch, tar or heavy oil with a low molecular weight. Also, a mixture may be used. Among these materials, coal tar pitch and petroleum pitch are preferred because they exhibit high capacity and low irreversible capacity.

If mesophase pitch, which is sintered at a low temperature of 300 to 600° C. is used as the precursor during or after the mixing step, a carbonizing or calcinating step is preferably performed to evaporate volatile portions of the amorphous carbon precursor. If the volatile portions of the amorphous carbon precursor are evaporated, durability and cycle life in the resulting battery are improved.

Thereafter, carbon core coated with the addition material and the amorphous carbon precursor are heat-treated at 2000 to 3200° C. under inert atmosphere or an air sealing atmosphere. In the heat-treating step, the amorphous carbon precursor on the surface and the surface structure of the carbon core is converted into a semi-crystalline, turbostratic structure or half onion-sheath structure by the catalyst element or the catalyst element $M_1M_2M_3 \ldots M_n$ compound. In the semi-crystalline shell, the catalyst element or the catalyst element $M_1M_2M_3 \ldots M_n$ compound, particularly metal boride, is uniformly distributed.

When the heat-treating step is performed at 2000 to 3200° C., the active material has an intensity ratio $I(110)/I(002)$ of an X-ray diffraction peak intensity $I(002)$ at a (002) plane to an X-ray diffraction peak intensity $I(110)$ at a (110) plane of less than 0.04. As an intensity ratio of an X-ray diffraction decreases, capacity increases. Generally, natural graphite having high capacity has an intensity ratio $I(110)/(002)$ of less than 0.04. It is shown that the negative active material of the present invention exhibits high capacity.

A Raman Spectroscopy intensity ratio $I(1360)/I(1580)$ of the core is 0.3 or less and the corresponding intensity ratio of the carbon surface is 0.2 or more.

The negative active material has 50 to 99.9% of the crystalline carbon core and 0.1 to 50 wt % of the semi-crystalline carbon shell having turbostratic structure. If the carbon shell is less than 0.1 wt %, charge and discharge efficiency is reduced. Whereas, the carbon shell is more than 50 wt %, discharge capacity and voltage flatness become poor.

Figure 2:
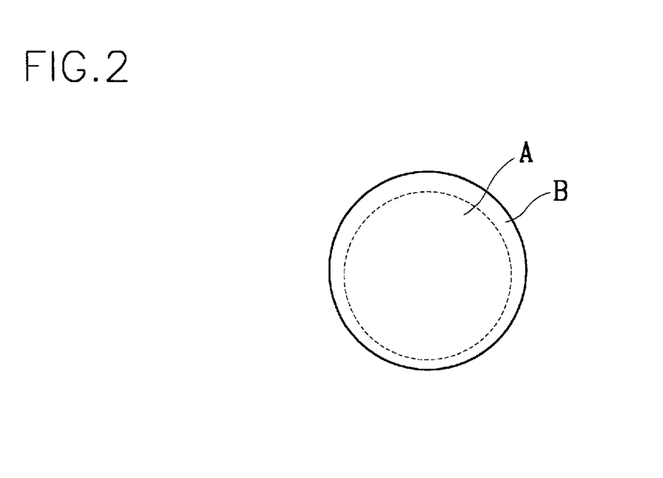
FIG. 2 is a sectional view showing a structure of the negative active material of one embodiment of the present invention.
Figure 3:
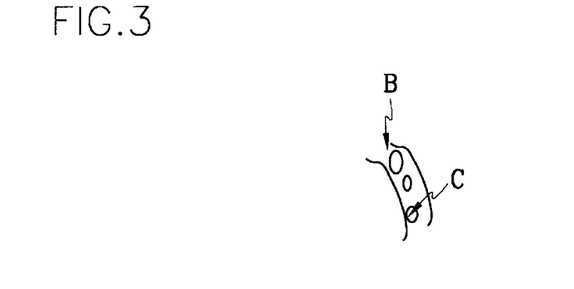
FIG. 3 is an enlarged diagram illustrating a surface of the negative active material of the present invention.
Figure 4:
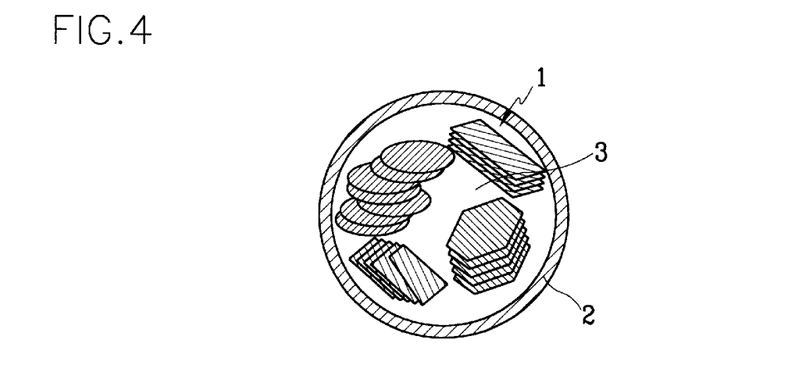
FIG. 4 is a sectional view showing a structure of the negative active material of another embodiment of the present invention.

As shown in FIG. 2, the negative active material of the present invention consists of the crystalline carbon core A and the semi-crystalline carbon shell B formeed on the core. Furthermore, the catalyst element or the catalyst element $M_1M_2M_3 \ldots M_n$ compound C is uniformly distributed in the carbon shell as shown in FIG. 3. In addition, as shown in FIG. 4, if the primary particles are used as the carbon core, two or more carbon core primary particles 1 are agglomerated to form secondary particles and the semi-crystalline carbon shell 2 are formed on the secondary particles. Although packed rechargeable batteries are generally produced, it is possible for microporous channels 3 to form between the primary particles. The microporous channel is formed between the primary particles. Owing to the microporous channel, the electrolyte is easily immersed into the negative active material of the present invention. Accordingly, the negative active material can provides a battery having improved high-rate charge and discharge and cycle life characteristics.

The negative active material of the present invention has a surface turbostratic structure or a half onion-sheath structure which enables a reduction in a side reaction between the electrolyte and the active material, and increases a crystallinity of the core, resulting in a good discharge capacity.

The present invention is further explained in more detail with reference to the following examples.

EXAMPLE 1

500 g of soft carbon cokes powder as a graphite precursor was put into an agglomaster (Hosakawa Co.). 10 g of titanium-t-isopropoxide was distributed into water to prepare a titanium solution and 20 g of $B_2O_3$ was dissolved in water to prepare a boron solution. The titanium and boron solutions were sprayed into the agglomaster. As a result, tiny particles of titanium-t-isopropoxide and $B_2O_3$ were adhered to a surface of the cokes powder.

The resulting material was heat-treated at 2800° C. to produce a negative active material for a rechargeable lithium battery. The negative active material included a carbon shell containing titanium boride.

EXAMPLE 2

A negative active material for a rechargeable lithium battery was prepared by the same procedure in Example 1 except that 15 g of titanium-t-isopropoxide and 30 g of $B_2O_3$ were used. As a result, the negative active material included a carbon shell containing titanium boride.

EXAMPLE 3

A negative active material for a rechargeable lithium battery was prepared by the same procedure in Example 1 except that 30 g of titanium-t-isopropoxide and 60 g of $B_2O_3$ were used. As a result, the negative active material included a carbon shell containing titanium boride.

EXAMPLE 4

A negative active material for a rechargeable lithium battery was prepared by the same procedure in Example 1 except that 10 g of nickel nitrate and 20 g of $B_2O_3$ were used. As a result, the negative active material included a carbon shell containing nickel boride.

EXAMPLE 5

A negative active material for a rechargeable lithium battery was prepared by the same procedure in Example 1 except that 15 g of nickel nitrate and 30 g of $B_2O_3$ were used. As a result, the negative active material included a carbon shell containing nickel boride.

EXAMPLE 6

A negative active material for a rechargeable lithium battery was prepared by the same procedure in Example 1 except that 30 g of nickel nitrate and 60 g of $B_2O_3$ were used. As a result, the negative active material included a carbon shell containing nickel boride.

EXAMPLE 7

A negative active material for a rechargeable lithium battery was prepared by the same procedure in Example 1 except that 500 g of cokes and 10 g of titanium boride powder were sprayed to an agglomaster. As a result, the negative active material included a carbon shell containing titanium boride.

EXAMPLE 8

A negative active material for a rechargeable lithium battery was prepared by the same procedure in Example 1 except that 500 g of cokes and 20 g of titanium boride were sprayed to an agglomaster. As a result, the negative active material included a carbon shell containing titanium boride.

EXAMPLE 9

A negative active material for a rechargeable lithium battery was prepared by the same procedure in Example 1 except that 500 g of cokes and 10 g of nickel boride (Aldrich, Co.) were sprayed to an agglomaster. As a result, the negative active material included a carbon shell containing nickel boride.

EXAMPLE 10

A negative active material for a rechargeable lithium battery was prepared by the same procedure in Example 1 except that 500 g of cokes and 20 g of nickel boride (Aldrich, Co.) were sprayed to an agglomaster. As a result, the negative active material included a carbon shell containing nickel boride.

EXAMPLE 11

A negative active material for a rechargeable lithium battery was prepared by the same procedure in Example 1 except that 500 g of cokes and 10 g of cobalt boride (Aldrich, Co.) were sprayed to an agglomaster. As a result, the negative active material included a carbon shell containing cobalt boride.

EXAMPLE 12

A negative active material for a rechargeable lithium battery was prepared by the same procedure in Example 1 except that 500 g of cokes and 20 g of cobalt boride (Aldrich, Co.) were sprayed to an agglomaster. As a result, the negative active material included a carbon shell containing cobalt boride.

EXAMPLE 13

A negative active material for a rechargeable lithium battery was prepared by the same procedure in Example 1 except that 10 g of zirconium boride and 500 g of cokes was sprayed to an agglomaster. As a result, the negative active material included a carbon shell containing zirconium boride.

EXAMPLE 14

Pitch in toluene (net weight of pitch: 20 g) was added to an alcohol mixture solution. The alcohol mixture solution was prepared by mixing 10 g of titanium-t-isopropoxide in isopropyl alcohol and 20 g of $B_2O_3$ in ethyl alcohol. The resulting mixture and 500 g of cokes were put into a mixer. As a result, the cokes were uniformly coated with titanium-t-isopropoxide, $B_2O_3$ and pitch.

Thereafter, the resulting cokes were heat-treated at 2800° C. to produce a negative active material for a rechargeable lithium battery. The negative active material included a carbon shell containing titanium boride and had high crystallinity.

EXAMPLE 15

A negative active material for a rechargeable lithium battery was prepared by the same procedure in Example 1 except that $TiO_2$ was used. At this time, the amount of $TiO_2$ was 3.6 wt % based on the total amount of cokes and $TiO_2$. As a result, the negative active material included a carbon shell containing titanium boride.

EXAMPLE 16

A negative active material for a rechargeable lithium battery was prepared by the same procedure in Example 1 except that $B_2O_3$ and $Sb_2O_3$ were used. At this time, the amounts of $B_2O_3$ and $Sb_2O_3$ were 3 wt % and 2 wt %, respectively, based on the total amount of cokes, $B_2O_3$ and $Sb_2O_3$. As a result, the negative active material included a carbon shell containing antimony boride.

EXAMPLE 17

A negative active material for a rechargeable lithium battery was prepared by the same procedure in Example 1 except that the mixture of $B_2O_3$ and $Mn(NO_3)_2.6H_2O$ was used. At this time, the amounts of $B_2O_3$ and $Mn(NO_3)_2.6H_2O$ were 3 wt % and 5.7 wt %, respectively, based on the total amount of cokes, $B_2O_3$ and $Mn(NO_3)_2.6H_2O$. As a result, the negative active material included a carbon shell containing manganese boride.

EXAMPLE 18

A negative active material for a rechargeable lithium battery was prepared by the same procedure in Example 1 except that a mixture of $B_2O_3$ and $V_2O_5$ was used. At this time, the amounts of $B_2O_3$ and $V_2O_5$ were 3 wt % and 2 wt %, respectively, based on the total amount of cokes, $B_2O_3$ and $V_2O_5$. As a result, the negative active material included a carbon shell containing vanadium boride.

EXAMPLE 19

A negative active material for a rechargeable lithium battery was prepared by the same procedure in Example 1 except that $B_2O_3$ and $Al_2O_3$ were used. At this time, the amounts of $B_2O_3$ and $Al_2O_3$ were 3 wt % and 1.7 wt %, respectively, based on the total amount of cokes, $B_2O_3$ and $Al_2O_3$. As a result, the negative active material included a carbon shell containing aluminum boride.

EXAMPLE 20

A negative active material for a rechargeable lithium battery was prepared by the same procedure in Example 1 except that 15 g of titanium-t-isopropoxide was only used. As a result, the negative active material included a carbon shell containing titanium.

EXAMPLE 21

A negative active material for a rechargeable lithium battery was prepared by the same procedure in Example 1 except that 15 g of nickel nitrate was only used. As a result, the negative active material included a carbon shell containing nickel.

EXAMPLE 22

A negative active material for a rechargeable lithium battery was prepared by the same procedure in Example 1 except that 30 g of boron oxide was only used. As a result, the negative active material included a carbon shell containing boron.

COMPARATIVE EXAMPLE 1

Cokes was heat-treated at 2800° C. to prepare a negative active material for a rechargeable lithium battery.

90 wt % of each of the carbonaceous materials according to Examples 1 to 22 and Comparative example 1 was mixed with a polyvinylidene fluoride binder in a N-methyl pyrrolidone solvent to be thereby made into a slurry. The slurry was then coated on a collector made of copper foil to thereby form a negative electrode plate. Next, a 2016 half-type cell was manufactured using the negative electrode plate together with a current electrode made of metallic lithium foil and an electrolyte of 1M $LiPF_6$ in an organic solvent of ethylene carbonate and dimethyl carbonate. The discharge capacity and charge and discharge efficiency at the first cycle of the batteries were measured and the results are presented in Table 1. The discharge capacity was measured at both 1.5V and 0.25V of discharge voltage.

TABLE 1

| | Discharge capacity at the first cycle [mAh/g] | | Charge and discharge efficiency | |
|---|---|---|---|---|
| | 1.5 V | 0.25 V | at the first cycle [%] | I(110)/I(002) |
| Example 1 | 348 | 315 | 93 | 0.012 |
| Example 2 | 354 | 320 | 94 | 0.009 |
| Example 3 | 338 | 311 | 93 | 0.018 |
| Example 4 | 337 | 305 | 93 | 0.019 |
| Example 5 | 349 | 310 | 93 | 0.011 |
| Example 6 | 343 | 315 | 94 | 0.012 |
| Example 7 | 351 | 320 | 92 | 0.009 |
| Example 8 | 342 | 311 | 93 | 0.014 |
| Example 9 | 343 | 309 | 93 | 0.015 |
| Example 10 | 339 | 310 | 93 | 0.018 |
| Example 11 | 339 | 315 | 93 | 0.017 |
| Example 12 | 342 | 311 | 93 | 0.015 |
| Example 13 | 348 | 315 | 94 | 0.011 |
| Example 14 | 343 | 305 | 93 | 0.015 |
| Example 15 | 350 | 312 | 94 | 0.009 |
| Example 16 | 348 | 318 | 94 | 0.009 |
| Example 17 | 345 | 309 | 93 | 0.011 |
| Example 18 | 344 | 312 | 94 | 0.011 |
| Example 19 | 350 | 314 | 93 | 0.010 |
| Example 20 | 320 | 300 | 93 | 0.032 |
| Example 21 | 315 | 289 | 91 | 0.038 |
| Example 22 | 342 | 275 | 94 | 0.015 |
| Comparative example 1 | 280 | 243 | 85 | 0.020 |

As shown in Table 1, the cells with the active materials including the catalyst element compounds according to Examples 1 to 22 exhibited good discharge capacity and charge and discharge efficiency when compared with Comparative example 1. In addition, when the cells of Examples 1 to 19 are compared with the cells in which titanium, nickel and boron, respectively according to Examples 20 to 22, are used for the negative active material, the cells of both groups of Examples exhibited similar discharge capacities, but the cells of Examples 1 to 19 exhibited lower voltage flatness and has higher discharge capacity than cells of Examples 20 to 22 because of a minimizing of capacity loss in the active material of the cells of Examples 1 to 19 as a result of side reaction between the active material and the electrolyte. Such superior characteristics are viewed to be a result of the formation of metal boride which has good electrical conductivity, on the carbon shell of the active materials according to Examples 1 to 19 such that current density of the active material is improved.

Furthermore, the contents of the catalyst elements in the negative active materials according to Examples 2, 5, 8, 10, 20 and 22 were measured by an ICP (inductive coupled plasma) method. The results are shown in Table 2.

TABLE 2

| | Ti [wt %] | B [wt %] | Ni [wt %] |
|---|---|---|---|
| Example 2 | 0.38 | 0.42 | — |
| Example 5 | — | 0.39 | 0.57 |
| Example 8 | 0.23 | 0.38 | — |

TABLE 2-continued

| | Ti [wt %] | B [wt %] | Ni [wt %] |
|---|---|---|---|
| Example 10 | — | 0.42 | 0.34 |
| Example 20 | 0.55 | — | — |
| Example 22 | — | 0.28 | — |

As shown in Table 2, the elements remained in all the negative active materials.

Figure 5:
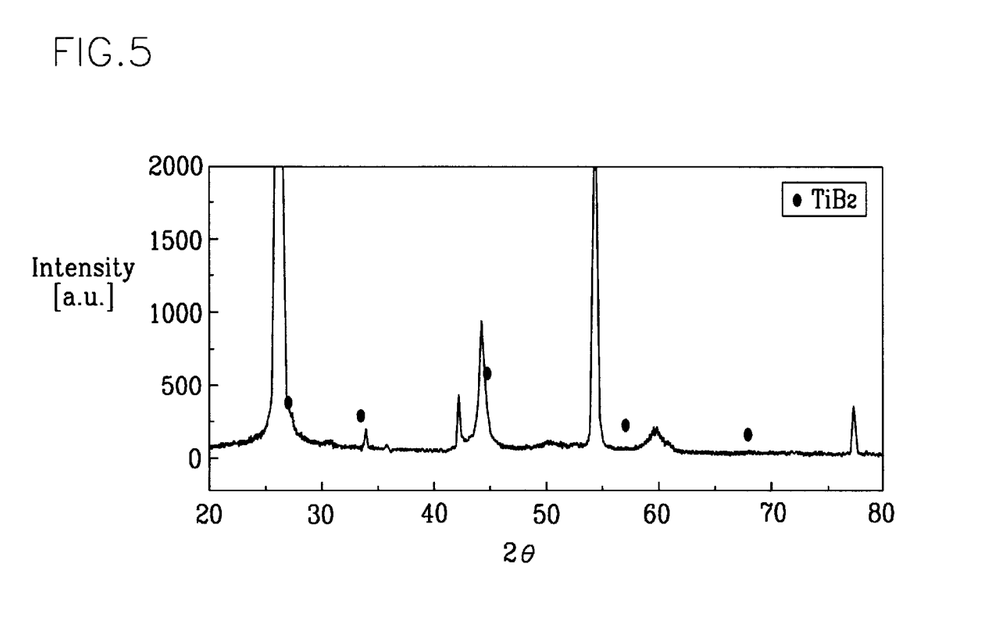
FIG. 5 is a graph illustrating an X-ray diffraction (XRD) patterns of the negative active material of the present invention.

An XRD pattern of the negative active material according to Example 2 was present in FIG. 5. As shown in FIG. 5, the negative active material of Example 2 included the $TiB_2$ catalyst element compound.

EXAMPLE 23

Boron oxide ($B_2O_3$) in a mixed solution of distilled water and isopropyl alcohol (water: alcohol=70:30 wt %) was added to soft carbon powder and mixed therewith. At this time, the ratio of soft carbon powder to boron oxide was 94 wt %: 6 wt %.

The mixture was put into a mixer. As a result, boron acid and pitch were uniformly coated on the carbon powder. The resulting carbon powder was heat-treated at 2800° C. to obtain a negative active material for a rechargeable lithium battery with high crystallinity.

EXAMPLE 24

A negative active material for a rechargeable lithium battery was prepared by the same procedure in Example 23 except that 6 wt % of $TiO_2$ was used instead of 6 wt % of boron oxide ($B_2O_3$).

EXAMPLE 25

A negative active material for a rechargeable lithium battery was prepared by the same procedure in Example 23 except that 3 wt % of boron oxide ($B_2O_3$) and 1.8 wt % of $TiO_2$ were used instead of 6 wt % of boron oxide ($B_2O_3$).

EXAMPLE 26

A negative active material for a rechargeable lithium battery was prepared by the same procedure in Example 23 except that a mixture of 3 wt % of $B_2O_3$ and 5.4 wt % of $Ni(NO_3)_2.6H_2O$ was used instead of 6 wt % of $B_2O_3$.

EXAMPLE 27

A negative active material for a rechargeable lithium battery was prepared by the same procedure in Example 23 except that mesophase pitch rather than carbon powder was heat-treated at 500° C. and the heat-treated mesophase pitch was carbonized.

EXAMPLE 28

A negative active material for a rechargeable lithium battery was prepared by the same procedure in Example 23 except that artificial graphite powder was used rather than carbon powder.

EXAMPLE 29

A negative active material for a rechargeable lithium battery was prepared by the same procedure in Example 23 except that natural graphite powder was used rather than carbon powder.

EXAMPLE 30

A negative active material for a rechargeable lithium battery was prepared by the same procedure in Example 23 except that a mixture of 1.8 wt % of $TiO_2$ and 5 wt % of furan resin was used instead of 6 wt % of $B_2O_3$.

COMPARATIVE EXAMPLE 2

Soft carbon powder was heat-treated at 2800° C. to produce artificial graphite with high crystallinity for a negative active material for a rechargeable lithium battery.

COMPARATIVE EXAMPLE 3

Natural graphite powder was used for a negative active material for a rechargeable lithium battery.

COMPARATIVE EXAMPLE 4

Cokes powder was graphitized at 2800° C. to produce a negative active material for a rechargeable lithium battery.

Each of the carbonaceous materials according to the Examples 23 to 30 and Comparative examples 2–4 was mixed with a polyvinylidene fluoride binder in a N-methyl pyrrolidone solvent to be thereby made into a slurry. The slurry was then coated on a collector made of copper foil to thereby form a negative electrode plate. Next, a 2016 half-type cell was manufactured using the negative electrode plate together with a current electrode made of metallic lithium foil and an electrolyte of 1M $LiPF_6$ in an organic solvent of ethylene carbonate, dimethyl carbonate and propylene carbonate.

The discharge capacity and charge and discharge efficiency of the obtained batteries were measured and the results are shown in Table 3. Furthermore, the electrochemical properties in the propylene carbonate electrolyte of the negative active materials according to Examples 16–19 were measured, and the results are presented in Table 3.

TABLE 3

|  | Capacity [mAh/g] | Initial charge and discharge efficiency [%] |
|---|---|---|
| Example 16 | 348 | 94 |
| Example 17 | 345 | 93 |
| Example 18 | 344 | 94 |
| Example 19 | 350 | 93 |
| Example 23 | 355 | 92 |
| Example 24 | 350 | 94 |
| Example 25 | 353 | 94 |
| Example 26 | 347 | 92 |
| Example 27 | 350 | 92 |
| Example 28 | 345 | 93 |
| Example 29 | 370 | 92 |
| Example 30 | 353 | 94 |
| Comparative example 2 | 310 | 89 |
| Comparative example 3 | 370 | 82 |
| Comparative example 4 | 303 | 85 |

As shown in Table 3, the cells of Examples 16–19, 23, 27 and 30, in which a catalyst element is used, have good discharge capacities and charge and discharge efficiencies compared to the cell of Comparative example 2 in which a catalyst element is not used. Furthermore, when the crystalline carbon was used as the carbon core, the cells of Examples 28–29 have better discharge capacities and charge and discharge efficiencies compared to the cells of Comparative examples 3 and 4. It is believed that such advantages result from the catalyst element used in the present invention. That is, the catalyst element increases the crystallinity of the core to thereby improve discharge capacity, and causes the conversion of the surface structure to a turbostratic or half onion-sheath structure, decreasing the reaction between the electrolyte and the active material such that charge and discharge efficiency is enhanced. Therefore, by using the negative active material of the present invention, a battery having a good charge and discharge efficiency even with the utilization of propylene carbonate electrolyte can be provided.

EXAMPLE 31

85 wt % of soft carbon was mixed with 5 wt % of boric acid and 10 wt % of pitch. The mixture was put into a mixer to coat the soft carbon with boric acid and pitch. The resulting material was heat-treated at 2800° C. to produce a negative active material for a rechargeable lithium battery. As a result, the negative active material included a carbon shell containing boron.

EXAMPLE 32

A negative active material for a rechargeable lithium battery was prepared by the same procedure in Example 31 except that nickel nitrate was used instead of boric acid. As a result, the negative active material included a carbon shell containing nickel.

EXAMPLE 33

A negative active material for a rechargeable lithium battery was prepared by the same procedure in Example 31 except that silicate was used instead of boric acid. As a result, the negative active material included a carbon shell containing silicon.

EXAMPLE 34

A negative active material for a rechargeable lithium battery was prepared by the same procedure in Example 31 except that natural graphite Do powder was used instead of carbon powder.

EXAMPLE 35

A negative active material for a rechargeable lithium battery was prepared by the same procedure in Example 31 except that artificial graphite powder was used instead of carbon powder.

COMPARATIVE EXAMPLE 5

Soft carbon powder was heat-treated at 2800° C. to produce artificial graphite for a negative active material for a rechargeable lithium battery.

COMPARATIVE EXAMPLE 6

Natural graphite powder was used for a negative active material for a rechargeable lithium battery.

COMPARATIVE EXAMPLE 7

Artificial graphite powder was used for a negative active material for a rechargeable lithium battery.

COMPARATIVE EXAMPLE 8

Cokes powder was heat-treated at 2800° C. to produce a negative active material for a rechargeable lithium battery.

An intensity ratio of I(110)/I(002) of negative active materials according to Examples 31 to 35 were measured and the results are shown in Table 4.

TABLE 4

| | I(110)/I(002) |
|---|---|
| Example 31 | 0.033 |
| Example 32 | 0.033 |
| Example 33 | 0.040 |
| Example 34 | 0.030 |
| Example 35 | 0.032 |

As shown in Table 4, the intensity ratios of I(1 10)/I(002) of the negative active materials according to Examples 1 to 5 were less than 0.04. Namely, the negative active materials of Examples 1 to 5 have identical X-ray diffraction intensity ratios to natural graphite such that the active materials exhibit high capacities.

Each of the carbonaceous materials according to Examples 31 to 35 and Comparative Examples 5–7 was mixed with a polyvinylidene fluoride binder in a N-methyl pyrrolidone solvent to be thereby made into a slurry. The slurry was then coated on a collector made of copper foil to thereby form a negative electrode plate. Next, a 2016 half-type cell was manufactured using the negative electrode plate together with a current electrode made of metallic lithium foil and an electrolyte of 1M LiPF$_6$ in an organic solvent of ethylene carbonate, dimethyl carbonate and propylene carbonate. The discharge capacity, and charge and discharge efficiency (discharge capacity/ charge capacity) were measured and the results are presented in Table 5.

TABLE 5

| | Discharge capacity [mAh/g] | Charge and discharge efficiency [%] |
|---|---|---|
| Example 31 | 338 | 87.0 |
| Example 32 | 316 | 86.3 |
| Example 33 | 290 | 61.3 |
| Example 34 | 352 | 79.3 |
| Example 35 | 320 | 82.2 |
| Comparative example 5 | 280 | 53.0 |
| Comparative example 6 | 347 | 51.0 |
| Comparative example 7 | 303 | 60.0 |

As shown in Table 5, the cells according to Examples 31 to 33 in which a catalyst element is used have good discharge capacities and charge and discharge efficiencies when compared with the cell manufactured according to Comparative example 5. Furthermore, the cells in which the negative active material includes crystalline core according to Examples 34 and 35 have good discharge capacities and greatly higher charge and discharge efficiencies relative to Comparative examples 6 and 7. It is believed that such advantages result from the catalyst element used in the present invention. That is the catalyst element increases the crystallinity of the core of the negative active material to thereby improve discharge capacity, and causes the conversion of the surface structure to a turbostratic structure so that the reaction of the active material with the electrolyte is prevented, increasing charge and discharge efficiency. Accordingly, even with the use of propylene carbonate, which has good reactivity with carbonaceous material, as the electrolyte solvent, superior charge and discharge efficiency can be obtained.

The negative active material of the present invention has good discharge capacity and charge and discharge efficiency, and enables the use of all types of electrolytes including propylene carbonate.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a rechargeable lithiun-battery comprising:
   a crystalline carbon core; and
   semi-crystalline carbon shell formed on the core, the semi-crystalline carbon shell including metal boride, and having a turbostratic or half onion-sheath, the metal boride serving graphitization catalyst and changing a structure of surrounding carbon.

2. The negative active material of claim 1 wherein the negative active material includes 0.005 to 10 wt % of B and 0.005 to 10 wt % of the element selected from the group consisting of transition metals, alkali metals, alkali earth metals, semi-metals of Group 3A, semi-metals of Group 3B, semi-metals of Group 4A, semi-metals of group 4B, elements of group 5A, elements of group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg; the semi-metal of Group 3A being selected from the group consisting of Sc, Y, La and Ac; the semi-metal of Group 3B being selected from the group consisting of Al and Ga, the semi-metal of Group 4A being selected from the group consisting of Ti, Zr and Hf; the semi-metal of Group 4B being selected from the group consisting of Si, Ge and Sn; the element of Group 5A being selected from the group consisting of V, Nb and Ta; the element of group 5B being selected from the group consisting of P, Sb, and Bi; the lanthanide being selected from the group consisting of Ce, Pr, Nd, Pm, Sm, Eu, Gd, Tb, Dy, Ho, Er, Tm, Yb and Lu and the actinium being selected from the group consisting of Th, U, Nb and Pu.

3. The negative active material of claim 1 wherein the negative active material includes 50 to 99.9 wt % of the crystalline carbon core and 0.1 to 50 wt % of the carbon shell.

4. The negative active material of claim 1 wherein the negative active material has an intensity ratio I(110)/I(002) of an X-ray diffraction peak intensity I(002) at a (002) plane to an X-ray diffraction peak intensity I(110) at a (110) plane of less than 0.04.

5. The negative active material for a rechargeable lithium battery of claim 1 including 0.01 to 20 wt % of metal boride.

6. The negative active material of claim 5 wherein the metal boride includes B and the element selected from the group consisting of transition metals, alkali metals, alkali earth metals, semi-metals of Group 3A, semi-metals of Group 3B, semi-metals of Group 4A, semi-metals of Group 4B, element of Group 5A, element of Group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg; the semi-metal-of Group 3A being selected from the group consisting of Sc, Y, La and Ac; the semi-metal of Group 3B being selected from the group consisting of Al and Ga; the semi-metal of Group 4A being selected from the group consisting of Ti, Zr and Hf; the semi-metal of Group 4B being selected from the group consisting of Si, Ge and Sn; the element of Group 5A being selected from the group consisting of V, Nb and Ta; the element of Group 5B being selected from the group consisting of P, Sb, and Bi; the lanthanide being selected from the group consisting of Ce, Pr, Nd, Pm, Sm, Eu, Gd, Tb, Dy, Ho, Er, Tm, Yb and Lu; and the actinium being selected from the group consisting of Th, U, Nb and Pu.

7. The negative active material of claim 6 wherein the metal boride is at least one compound selected from the group consisting of $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride and cobalt boride.

8. A method of preparing a negative active material for a rechargeable lithium battery comprising:

mixing amorphous carbon or crystalline carbon with liquid metal boride, the metal boride serving graphitization catalyst and changing a structure of surrounding carbon; and graphitizing the mixture at 2000 to 3200° C.

9. The method of claim 8 wherein the metal boride includes B and the element selected from the group consisting of transition metals, alkali metals, alkali earth metals, semi-metals of Group 3A, semi-metals of Group 3B, semi-metals of Group 4A, semi-metals of Group 4B, elements of Group 5A, elements of Group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg; the semi-metal of Group 3A being selected from the group consisting of Sc, Y, La and Ac; the semi-metal of Group 3B being selected from the group consisting of Al and Ga; the semi-metal of Group 4A being selected from the group consisting of Ti, Zr and Hf; the semi-metal of Group 4B being selected from the group consisting of Si, Ge and Sn; the element of Group 5A being selected from the group consisting of V, Nb and Ta; the element of Group 5B being selected from the group consisting of P, Sb, and Bi; the lanthanide being selected from the group consisting of Ce, Pr, Nd, Pm, Sm, Eu, Gd, Tb, Dy, Ho, Er, Tm, Yb and Lu; and the actinium being selected from the group consisting of Th, U, Nb and Pu.

10. The method of claim 8 wherein the amorphous carbon or crystalline carbon includes at least one particle.

11. The method of claim 8 wherein the mixing step is performed by agglomerating and coating at substantially the same time.

12. The method of claim 8 wherein an amorphous carbon precursor is further added in the mixing step.

* * * * *